July 11, 1944.
C. E. HEMMINGER
2,353,563
HALOGENATION PROCESS
Filed Feb. 1, 1940
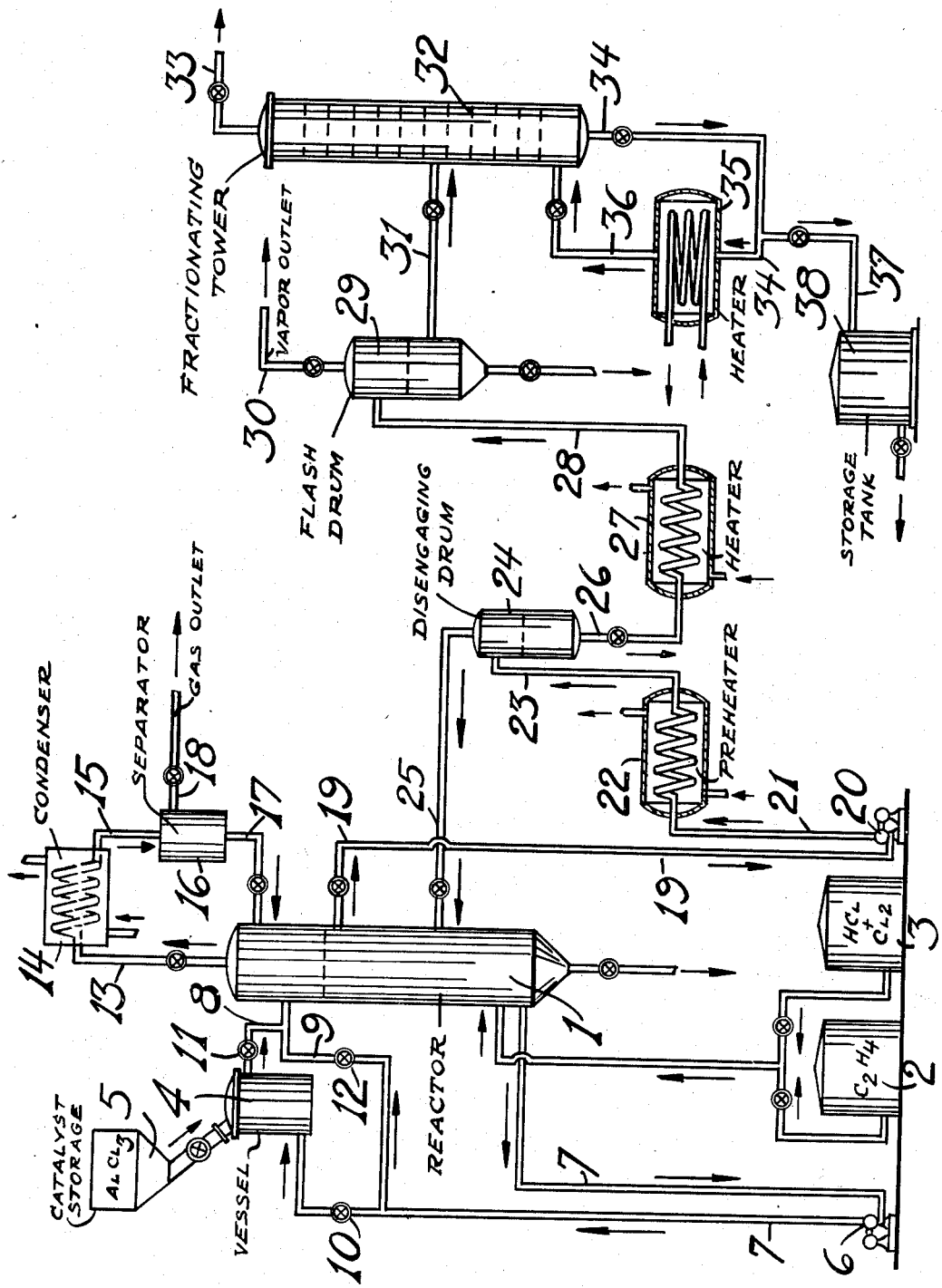
Charles E. Hemminger Inventor
By  Young  Attorney Patented July 11, 1944

2,353,563

UNITED STATES PATENT OFFICE 2,353,563

HALOGENATION PROCESS

Charles E. Hemminger, Westfield, N. J., assignor to Standard Oil Development Company, a corporation of Delaware Application February 1, 1940, Serial No. 316,741

2 Claims. (Cl. 260—660)

This invention relates to the manufacture of olefin dihalides by the reaction of olefins with a free halogen, and it has particular reference to a process in which alkyl monohalides and olefin dihalides are produced simultaneously.

It has been found that olefin dihalides may readily and economically be produced by bringing an olefin and a free halogen into contact in the presence of a liquid consisting entirely or in major part of the dihalide being formed. The process is especially advantageous when a catalyst of the Friedel-Crafts type, such as aluminum chloride, bismuth trichloride, antimony trichloride, ferric chloride, etc., is used to promote the reaction; and it is especially suitable for reactions of olefins containing six carbon atoms or less. The catalyst may conveniently be dissolved or suspended in the bath. The olefin dihalide forms an excellent medium for making a contact between the catalyst and the reactants. It is in all cases of sufficiently high boiling point to permit condensation without the use of refrigeration, and the reaction temperature may be readily controlled by the refluxing of the liquid. As an example, ethylene dichloride may be produced by reacting ethylene and chlorine in a bath of ethylene dichloride containing in solution aluminum chloride, the reaction being conducted at atmospheric pressure and at a temperature of about 84° C., the product being continually refluxed.

It has further been found, in accordance with the present invention, and as a special application of the method above described, that alkyl monohalides and olefin dihalides may be formed simultaneously by the reaction of an olefin with a mixture of a hydrogen halide and a free halogen. A portion of the olefin reacts with the hydrogen halide to form an alkyl monohalide, and a further portion of the olefin reacts with the free halogen to form the dihalide. By this method the advantages of the presence of the dihalide as a reaction medium for the formation of both the monohalides and the dihalides are obtained by the continuous formation of the dihalide. The method is especially suitable for reactions with olefins containing six carbon atoms or less. For such a reaction metal halide catalysts of the type described are satisfactory. A mixture of ethyl chloride and ethylene dichloride may, for example, be formed by the reaction of ethylene with a mixture of hydrogen chloride and chlorine in the presence of an aluminum chloride catalyst, using as a reaction medium the mixture of the products formed.

There are several advantages to be attained in the simultaneous reaction of olefins with a hydrogen halide and a free halogen. One important advantage has been discussed above, namely, the raising of the boiling point of the reaction bath, whereby the necessity for costly refrigeration is avoided. Another advantage consists in the use of a single plant for the manufacture of two chemicals, since one large plant is cheaper to build than two small ones. A still further advantage arises in the case where the hydrogen chloride is produced by burning hydrogen in an atmosphere of chlorine. Where only the alkyl monohalide is to be produced, an excess of chlorine must be avoided to obtain a pure product. It is difficult to attain this without the production of a gas containing some excess of hydrogen. This entails the use of costly means of recovering the product from the excess hydrogen as well as a direct economic loss in the hydrogen involved. By the present process, an excess of chlorine will always be used in the manufacture of hydrogen chloride, and the problem of producing a pure hydrogen chloride gas is eliminated. A still further advantage in the use of the combination process results from the fact that in the direct halogenation reaction there will be less tendency toward the formation of highly halogenated substitution products such as tetrachloroethane, owing to the low partial pressure of halogen and the presence of a considerable proportion of hydrogen halide.

In general, the reaction conditions for the simultaneous formation of monohalides and dihalides are similar to those which have been found suitable for the formation of monohalides alone. The reaction temperature will, in general, however, be somewhat higher where the reaction is to be conducted in the liquid phase on account of the presence of the dihalide product in the reaction bath. The temperature should, of course, not be above that of the boiling point of the reaction mixture at the prevailing pressure, and may be as low as —20° C. It is preferable to employ temperatures which are in any case not above 100° C. In the case of the reaction of ethylene with hydrogen chloride and chlorine, temperatures ranging from about —20° C. to about 60° C. are preferable. The reaction may, in general, be carried out at pressures ranging from subatmospheric to 300 pounds per square inch gauge or even higher. It is ordinarily advantageous to employ pressures from atmospheric to 15 pounds per square inch gauge.

Any metal halide catalyst may be employed for the present process, but aluminum chloride is especially suitable. A catalyst concentration of about 1% to about 2% in the reaction bath is preferable, but concentrations up to 5% or even 10% may be employed.

While any ratio of free halogen to hydrogen halide may be employed in the feed stock, it is generally preferable to employ molar concentrations of free halogen in the mixture which are not greater than 10%. The molar ratio of the hydrogen halide or hydrogen halide-halogen mixture to the olefin which is passed to the reaction chamber is preferably from about 0.9 to about 1.0.

The monochloride and dichloride products from a combination reaction of the type described may be separated from each other by any suitable means, such as distillation. Small proportions of olefin polymers are frequently formed in the catalytic production of alkyl monochlorides, and such polymers are generally obtained as bottoms in the first separation of products, along with the partially spent catalyst. The lighter monochloride may thus be separated from the remainder of the reaction product, and the latter may be fractionated to separate the dichloride from the polymer oil and catalyst.

A preferred embodiment of the present invention, designed to be used in the continuous production of ethyl chloride and ethylene dichloride by the reaction of a mixture of hydrogen chloride and free chlorine with ethylene in the presence of aluminum chloride as a catalyst, which is dissolved in a bath consisting of ethyl chloride and ethylene dichloride, is shown in the accompanying drawing and described in detail below. The drawing is a diagrammatic sketch of suitable apparatus for carrying out this process and indicates the flow of materials. The ethylene employed in the reaction is a by-product of the cracking of petroleum products and is of 85% to 95% purity, the impurities consisting of light saturated hydrocarbon gases. The method is, however, not restricted to the use of ethylene of such high purity. More dilute ethylene may be used, such as a product of petroleum oil cracking containing substantial proportions of hydrogen, light paraffins and small percentages of other light olefins; or there may be present other non-reactive constituents. The mixture of hydrogen chloride and chlorine contains about 10% molar concentration of chlorine and is produced by burning hydrogen in an atmosphere of chlorine. These reactants are introduced into a packed reactor 1 of proper height, in the form of a mixture containing a hydrogen chloride-chlorine to ethylene mol ratio of about 0.9 to 1.0, and are supplied from storage vessels 2 and 3, containing ethylene and the hydrogen chloride-chlorine mixture, respectively.

The reaction is advantageously caused to take place at about 15 pounds per square inch gauge pressure and at a temperature of about 40° C. The initial and average concentration of the aluminum chloride in the reactor is maintained at about 1% to about 2% by the circulation system shown in the drawing. In this system solid catalyst is introduced into vessel 4 from a source of supply 5 by gravity or by other suitable means. Circulation of a part of the reaction product in reactor 1 through the body of the solid catalyst and back to the reactor is maintained by means of pump 6 which forces the liquid through vessel 4 and back through line 8 into the reactor. The concentration of catalyst in reactor 1 may be accurately controlled by means of valves 10, 11 and 12, a part of the circulating liquid being permitted to by-pass vessel 4 by means of line 9.

When free chlorine is present to the extent of 10% in the hydrogen halide feed and the operation is continuous, an equilibrium condition will be set up whereby the reaction bath will contain about 60 mol per cent of ethylene dichloride and 40 mol per cent of ethyl chloride, the higher ratio of ethylene dichloride being due to the lower partial pressure of the ethylene dichloride in the reactor.

Unreacted gases and some vaporized products pass from the top of the reactor through line 13 to reflux condenser 14, which is cooled by circulating water, and thence back through line 15 to separator 16. The condensate, consisting largely of recovered products, is returned to reactor 1 by means of line 17, while uncondensed gases pass out through line 18. The products of the reaction are withdrawn continuously from the reactor through line 19, pump 20 and line 21. These products are then passed through a preheater 22, where the temperature is raised to about 90° C., and then passed by means of line 23 to disengaging drum 24, where any dissolved gases separate from the liquid and are returned to the reactor through line 25. The remaining liquid passes by means of line 26 to a heater 27, where the temperature is further raised to about 120° °C., and passed through line 28 to flash drum 29, where the ethyl chloride is vaporized, while the ethylene dichloride, polymer and partially spent catalyst remain as liquid. The ethyl chloride vapor passes out of the top of flash drum 29 through line 30 to purification apparatus not shown.

The bottoms in the flash drum 29 are drawn off by means of line 31 to a fractionating column 32, where the ethylene dichloride is separated from the polymer oil and partially spent catalyst and passes out through line 33, while the bottoms of this tower are circulated through line 34, heater 35 and line 36 back to the tower to maintain the required fractionation temperature. A portion of the bottoms is continually drawn off from the tower by means of line 37, leading from line 34 to a storage vessel 38.

It is to be understood that the present invention is not limited to the reaction of a single olefin with a mixture of hydrogen halide and free halogen, but includes the reaction of a mixture of olefins in this manner. Furthermore, it is not necessary that the free halogen employed correspond to the halogen of the hydrogen halide. A mixture of bromine with hydrogen chloride, may, for example, be reacted with ethylene to form ethyl chloride and ethylene dibromide. Other halogens and other halogen halides may likewise be reacted together. In case any of the products of reaction are too low in vapor pressure or are produced in quantities in excess of that required for maintaining an equilibrium mixture which will correspond to the desired reaction temperature, they may be removed from the reaction bath by any suitable means, such as the distillation of a part of the bath.

This invention is not to be considered as limited by any of the examples described or mentioned which are given by way of illustration only, but is to be limited solely by the terms of the appended claims.

I claim:
1. A process for the simultaneous production of ethyl chloride and ethylene dichloride which comprises reacting ethylene with a mixture containing about 90 mol per cent of hydrogen chloride and about 10 mol per cent of free chlorine at a temperature of about 40° C. and a pressure of about 15 pounds per square inch gauge in liquid phase, the reaction medium consisting essentially of a mixture of about 60 mol per cent of ethylene dichloride and about 40 mol per cent of ethyl chloride, such mixture containing in solution from about 1% to about 2% of aluminum chloride.

2. A process for the simultaneous production of ethyl chloride and ethylene dichloride which comprises reacting ethylene with a mixture containing about 90 mol per cent of hydrogen chloride and about 10 mol per cent of free chlorine at a temperature of about 40° C. and a pressure of about 15 pounds per square inch gauge in liquid phase, the reaction medium consisting essentially of about 60 mol per cent of ethylene dichloride and about 40 mol per cent of ethyl chloride, in the presence of an aluminum chloride catalyst.

CHARLES E. HEMMINGER.